CdSe SUBSTRATE
CdS ELECTRODES

CdS

TEMPERATURE OF SUBSTRATE — 80°C

TEMPERATURE OF VACUUM EVAPORATING SOURCE — 800°C

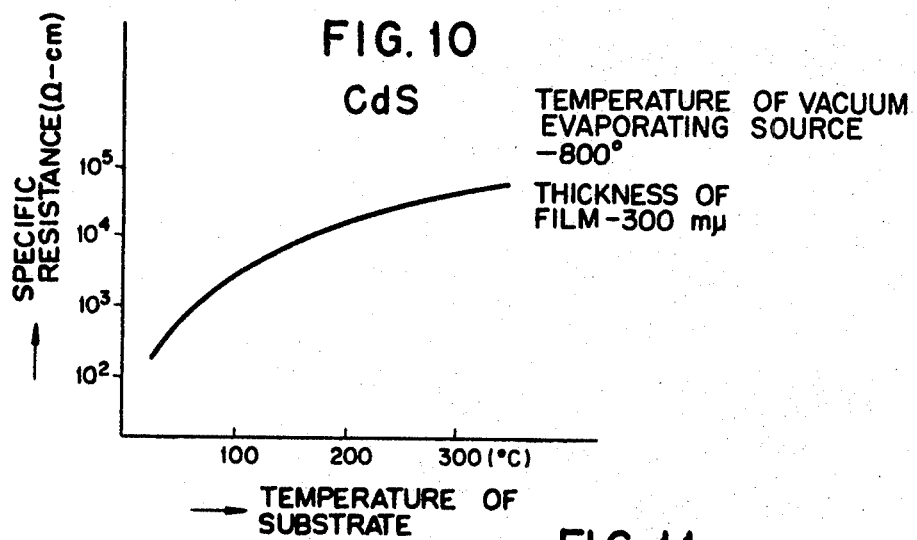
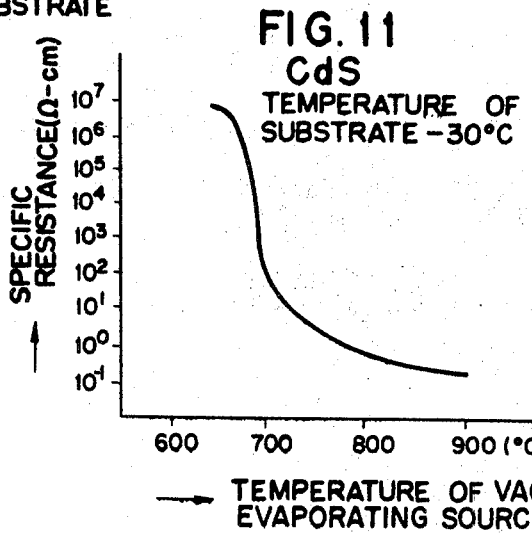
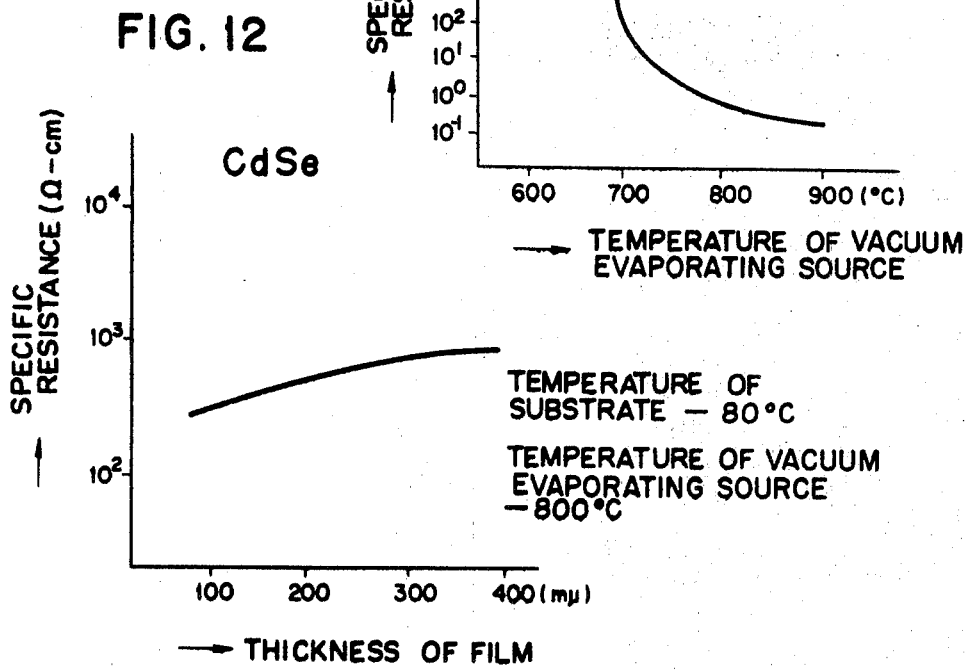

United States Patent Office 3,826,683
Patented July 30, 1974

3,826,683
METHOD OF PRODUCING A PHOTO-CONDUCTIVE CELL
Kazuhiko Ihaya, Tokyo, Japan, assignor to Canon Camera Kabushiki Kaisha, Tokyo, Japan
Original application Feb. 21, 1968, Ser. No. 707,263, now Patent No. 3,594,683, dated July 20, 1971. Divided and this application Aug. 10, 1970, Ser. No. 62,608
Claims priority, application Japan, Feb. 27, 1967, 42/12,442; Mar. 9, 1967, 42/14,902; May 31, 1967, 42/34,711
Int. Cl. B44d 1/18; C23c 13/04, 15/00
U.S. Cl. 117—212                           3 Claims

ABSTRACT OF THE DISCLOSURE

This invention provides a photoconductive cell and means for producing the same for use in photometry having the specific property that current flowing through the cell is substantially proportional to the logarithm of the intensity of illumination of luminous flux. The electrodes of the cell have a resistance value corresponding to the intermediate value of specific resistance which the photoconductive body exhibits between the upper and lower limits within the photometric range. The electrodes of the cell have no rectifying property or only a little rectifying property between the electrodes and the photoconductive body, and that when it is difficult to obtain the desired specific resistance from a production point of view or by any other reason, material of the electrodes may be selected from one or more kinds of materials whose work function is the same or similar to that of the photoconductive body.

---

This application is a division of copending application Ser. No. 707,263, filed Feb. 21, 1968 and now U.S. Pat. No. 3,594,683, issue date July 20, 1971.

This invention relates to photoconductive cell for use in photometry, more particularly to the photoconductive cell having such a specific property that current flowing through the cell is substantially proportional to the logarithm of the intensity of illumination of luminous flux, and the method for producing the photoconductive cell.

Hitherto, the conventional photoconductive cells, especially those in the photographic art have used in such a form of arrangement that a photoconductive layer is formed by stratifying photoconductive material on an insulating substrate, and metal electrode plates are deposited on the layer. For example, so called sinter-type photoconductive cells have been generally used which were prepared in such steps that an aqueous solution of photoconductive sulfides such as CdS, CdSe etc. is sprayed on the substrate such as ceramics in an appropriate thickness, the sprayed product is sintered in a furnace to form the photoconductive layer, and then comb-like metal electrodes are deposited on the photoconductive layer by the vacuum evaporation technique.

The photoconductive cells for use in photometry have the specific resistance represented by $$(R^\Omega/\square)$$

when the luminous flux of I lux of the intensity of illumination is impinged thereon, and the relation therebetween can be represented by the equation given below.

$$R=k/I^\gamma$$

Where $k$ stands for the specific resistance when the intensity of illumination of the incident luminous flux is $I$ lux, and $\gamma$ is the constant showing the specific values of the respective photoconductive cells. Therefore, the logarithm of both sides of the above equation is such that $\log R = \log k - \gamma \log I$. Thus the logarithm of the resistance value R of the photoconductive cell and the logarithm of the intensity of illumination I of the incident flux of light are in the linear relationship. However, when an ordinary photoconductive cell having such specific properties is combined with the photometric circuit, the following defects are brought about. For example, consider a serial type photometric circuit wherein the photoconductive cell, the galvanometer for indicating exposure value, compensating resistor and a battery are serially connected for simple photometric circuit for exposure. When the flux of light to be measured impinges on the photoconductive cell, the specific resistance R of the photoconductive cell varies in accordance with the intensity of illumination I with relation to the above equation thereby to control the current flowing through the galvanometer, and the indication of the exposure value in accordance with the intensity of illumination I is established by the indicator of the galvanometer. In such a case, when the specific resistance R of the photoconductive cell and the intensity of illumination I of the luminous flux incident upon the cell are in the linear relationship as mentioned above, the amount of current flowing through the galvanometer and the photoconductive cell is not proportional to the intensity of illumination I. It is for this reason that, when the intensity of illumination I is small or large, the change of the current flowing through the galvanometer and the photoconductive cell is smaller with respect to the change of the logarithm, log. I of the intensity of illumination I, while when the intermediate intensity of illumination is projected the change of the current becomes larger. Therefore, the amount of the current flowing through the galvanometer is not proportional to the logarithm of the intensity of illumination I in the linear relationship.

In the photometric circuit, it is often desired that the current flowing through the galvanometer for indicating the exposure is linearly proportional to the logarithm, log.$I$ of the measured intensity of illumination of the flux of light. It is for this reason that, according to logarithmic characteristic of illumination I versus current in the photoconductive cell as mentioned above in case where an uniform scale meter—meter in which the angle of deviation thereof is proportional to the amount of current flowing therethrough—is used for the galvanometer indicative of the exposure value, the angle of deviation of the meter is not linearly proportional to the logarithm of the intensity of illumination of the measured luminous flux in the lower region, center region, and upper region of the intensity of illumination of luminous flux, rather the galvanometer indicates the exposure value by different scale in the respective regions. Therefore, the scale of non-uniform intervals must be provided on the galvanometer particularly since the change of current in the lower and upper regions of the intensity of illumination is small with respect to the change of the logarithm of the intensity of illumination the angle of deviation is small and therefore only the center region of the intensity of illumination of the measured luminous flux exhibits appropriate angle of deviation available for the indication of exposure value.

Thus, when the conventional photoconductive cell has been used for photometry, the range of effective photometry has been remarkably narrow, and it has been impossible to achieve photometry over a wide range. For example, French Pat. No. 1,324,659 discloses an arrangement which includes a compensating circuit comprising a non-linear element, such as photoconductive cell, diode, transistor etc. connected in series or in parallel to the photoconductive cell in the photometric circuit wherein the range which has linearly proportional relationship between current flowing through the galvanometer and the logarithm, log.$I$ of the intensity of illumination of the incident flux is expanded structurely with the result that the photometric region is expanded. Japanese Patent Application Publication No. 11,300/1964, now Japanese Pat. No. 501,501, discloses that a plurality of photoconductive cells are used connected by means of resistors thereby to expand the range in which current flowing through the galvanometer is proportional to the logarithm, $\log I$ of the intensity of illumination of the incident flux with the consequence that the photometric region is intended to be expanded.

All of these conventional techniques referenced above require complicated compensating circuit which employ special elements or a plurality of photoconductive cells in combination with the photometric circuit, and therefore the arrangement is very complicated and, in addition, has various kinds of defects. Therefore, an object of the invention is to expand the photometric region of the photoconductive cell in completely different manner. The above object of this invention is attained by novel photoconductive cell per se rather than the improvement of circuit arrangement used in the prior art.

The photoconductive cell in accordance with the invention has electrodes of which resistivity is wholly or partially set to relative high value. When the photoconductive layer formed on the substrate—hereinafter refer to as "photoconductive body"—has high resistivity because the intensity of illumination of the luminous flux is low, the resistivity of the electrodes does not so much affect the whole resistivity of the photoconductive cell so that the ratio of the change of the resistivity to the intensity of illumination of the luminous flux incident upon the photoconductive body in the cell is maintained in the relationship of the intensity of illumination versus resistivity of the photoconductive body per se when the intensity of illumination of the flux is in the neighborhood of the center region in the measured intensity of illumination range, and the resistivity of the photoconductive body is close to the resistivity of the electrodes, the ratio of the change of the resistivity to the intensity of illumination of the flux of light is made to be small by virtue of the resistivity of the electrodes. When the specific resistivity of the photoconductive body decreases due to the increased intensity of illumination, only small and substantially constant current flows through the comb-like resistance portions of the electrodes as compared to the current flowing through the whole cell, and current is flowed mainly through the non-electrode portions, i.e., the photoconductive body without going through the comb-like resistance portions of the electrodes, thereby characteristic of the intensity of illumination versus resistivity in the cell is brought close to that of the photoconductive body per se so that the current flowing through the photoconductive cell is linearly proportional, in substance, to the logarithm of the intensity of illumination of the photometric flux over the wide range. Herein "specific resistance" refers to the resistance value between two opposing faces of film forming material of unit length square, but does not always mean the specific resistance which is inherent to material. In the following description, the term "specific resistance" is used in such a sense as defined above.

The photoconductive cell in accordance with this invention as described above is such that a part or the whole of the electrodes formed on the photoconductive body have relatively high specific resistance, in other words, the electrodes have a intermediate value of specific resistance in which the photoconductive body exhibits in the upper and lower limits of the photometric range so that the current flowing through said cell is substantially and linearly proportional to the logarithm of the intensity of illumination of the photometric luminous flux over the wide range. Therefore, the combination of such photoconductive cell with a photometric circuit permits photometry over the remarkably wide range with only one photoconductive cell without providing any complicated circuit.

On the other hand, in order to attain the expected characteristics with the photoconductive cell of this invention, it is necessary to select appropriately the quality of the photoconductive body, the pattern of the electrodes formed on the body, the number of comb teeth of the electrodes and so on, and in addition the quality of the electrodes becomes an important factor which affects the characteristics of the photoconductive cell. It is for this reason that if qualities of the photoconductive body and of the electrodes formed thereon are different, work function is naturally different from each other, and therefore when the electrodes are formed on the photoconductive body, potential barrier is thus established therebetween. For example, when the electrodes made of metal are deposited on the photoconductive body of semiconductive material, electrons flow from the photoconductive body which has smaller work function to the metal electrodes, on the metal electrodes the negative surface charges are generated whilst the photoconductive body is positively charged and a space charge layer is established on the contact surface of both so that this layer acts as a potential barrier.

As described above, a barrier is established between the photoconductive body and the electrodes depending upon the qualities thereof in the photoconductive cell. This means that there is a rectifying characteristic between the photoconductive body and the electrodes in the photoconductive cell. The potential barrier is generally lowered when the photoconductive body is irradiated with strong light, and therefore the rectifying characteristics matter little but at the low intensity of illumination, it presents large rectifying characteristics. Therefore, when there is rectifying characteristics between the photoconductive body and the electrodes, the contact resistance between photoconductive material and material of the electrodes is considerably great within the range of the low intensity of illumination of the photometric luminous flux, and the resistivity of the photoconductive cell is not lowered, and therefore the expected characteristics cannot be obtained. Further, such an electrode contact causes the drift of current or response delay, and no preferable result can be obtained.

In view of the foregoing discussion, the electrodes of photoconductive cell in accordance with this invention must satisfy two conditions:

(1) the electrodes have the intermediate value of specific resistance in which the photoconductive body exhibit in the upper and the lower limits within the photometric range, and (2) the electrodes have no rectifying property or only a little rectifying property between the electrodes and the photoconductive body. In accordance with this invention, in order to obtain the photoconductive cell having desired properties which can satisfy two conditions as mentioned above the electrodes of the photoconductive cell are made of material which is substantially the same as material of the photoconductive body and of material which does not present photoconductivity. In accordance with the second feature of the invention when it is difficult to obtain the desired specific resistance from a standpoint of production or other conditions, material of the electrodes may be selected from one or more kinds of materials whose work function is similar to that of the photoconductive body, such as the photoconductive material to get desired specific resistance. Again, in accordance with the first feature of this invention, material of the electrodes is made of the same material as the photoconductive body and of material which does not present photoconductivity, and therefore when the electrodes and the body are contacted, a potential barrier is not established therebetween two, and no rectifying property appears. While, in accordance with the second feature of this invention, only a negligible potential barrier is established between the electrodes and the photoconductive body and the two conditions mentioned above can be satisfied.

Generally, as the photoconductive material for use in the photoconductive cell, it is possible to use compounds of Group II–VI such as CdS, CdSe, CdTe, ZnS, XnSe, ZnTe, ZnO or the like; solid solutions of Cd(S.Se), (Zn.Cd)S or the like or compounds of Group III–V such as Gap, InSb and the like elements of Group IV such as Ge, Si and the like and organic photoconductive materials such as anthracene, polyvinyl carbazole and the like. In particular, as the photoconductive material for photometry in visible range, CdS, CdSe etc. are especially excellent among the compounds of Group II–VI.

As described hereinbefore, the electrodes in the photoconductive cell of the invention are selected from the same material as the photoconductive body or one or more kinds of materials whose work function is similar to that of the photoconductive body and which material exhibits no photoconductivity such as photoconductive materials.

Generally, photoconductive material can change the specific resistance of the same material or can control an appearance or non-appearance of photoconductivity by controlling the deviation from stoichiometrical composition of the crystal structure, or by adding appropriate impurities. For example, when CdS of stoichiometrical composition is heated under vacuum, a part of S is evaporated, so that Cd becomes excessive, the resistance is lowered, and CdS without substantial photoconductivity is produced. When $CdCl_2$ is added to CdS of stoichiometrical composition and the mixture is thermal-treated, Cl enters into CdS as the donor center, and CdS having low resistivity and of photoconductivity can be obtained.

On the other hand, when CdS of stoichiometrical composition is heated under vapour of S, the excess of Cd is little, and therefore CdS of high resistivity and low photoconductivity can be obtained. When Cu is added thereto and the mixture is thermal-treated, Cu enters as acceptors, and the resistivity is raised, and CdS showing photoconductivity can be obtained.

Thus, through the steps mentioned above, it is possible to produce the electrode material in accordance with the first feature of the invention which is the same material as the photoconductive body can satisfy the two conditions (1) and (2) mentioned hereinbefore and does not present photoconductivity. It is possible to control the photoconductivity and the specific resistance if the photoconductive material is suitably selected as electrode material even if it is different from material of the photoconductive body, and therefore it is also possible to produce the photoconductive cell in accordance with the second feature of the invention which can satisfy the two conditions (1) and (2) described hereinbefore.

In the foregoing discussion it has been explained that it is possible to produce desired photoconductive cell by controlling the specific resistance and photoconductivity of the photoconductive materials to be used as the electrode material by controlling the deviation from stoichiometrical composition. Further, it has been found by the inventor that when CdS is selected as the electrode material from among the photoconductive materials, the deviation from stoichiometrical composition varies easily due to the conditions such as the thickness of the vacuum evaporated film, the temperature of the substrate, the temperature of the vacuum evaporating source and so on in forming the electrodes by vacuum evaporating such material on the photoconductive body as compared with the case where the same photoconductive material, for example, CdSe which is the same semiconductive compound of Group II–VI as CdS is vacuum evaporated, and that specific resistance varies over remarkably large range.

Thus, when CdS is used as the electrode material to form the electrodes on the photoconductive body by vacuum evaporating, it is possible to easily produce the vacuum evaporated electrodes having any optional specific resistance by combining appropriately the conditions such as the thickness of vacuum evaporated film, the temperature of the substrate, the temperature of the vacuum evaporating source and the like thereby easily produce the electrodes which have desired specific resistance. Especially, the photoconductive cell prepared by using CdS as the photoconductive body is superior for photometry in the visible region, and therefore when the same material is used for the electrode material, a barrier is not established on the contact surface between the photoconductive body and the electrode, and a property close to ohmic contact is obtained. On the other hand, when other photoconductive materials other than CdS are used as the photoconductive body, relatively low rectifying property is presented between the photoconductive body and CdS electrodes, so that desired result can be attained.

An object of this invention is to provide a photoconductive cell capable of photometry by itself over the wide range.

Another object of this invention is to provide the photoconductive cell capable of photometry by itself over the wide range without employing compensating means in circuit.

Another object of this invention is to provide the photoconductive cell wherein current which flows through the cell and is controlled by the resistivity of the cell is substantially proportional to the logarithm of the intensity of illumination over the wide range.

Further, another object of this invention is to provide the photometric circuit capable of performing the photometry over the wide range of illumination with remarkably simple circuit arrangement as compared with the conventional circuit.

Further, another object of this invention is to provide the photometric circuit of low cost and saving space and in addition capable of performing the photometry over the wide range of illumination without requiring adjustment.

Further, another object of this invention is to provide the method for producing photoconductive cell capable of performing the photometry over the wide range of illumination.

Another object of this invention is to provide the method for producing the photoconductive cell wherein the current which flows through the photoconductive cell is controlled by the resistance value of the cell is substantially proportional to the logarithm of the intensity of illumination of the measured flux of light over the wide range.

Another object of this invention is to provide the method for producing photoconductive cell including the step of vacuum evaporating cadmium sulfide to form the electrodes.

These and other objects, features and advantages of the invention will be understood by reading the detailed explanation in connection with the embodiments shown in the attached drawings.

It should be noted that the embodiments shown in the attached drawings are merely illustrative of the invention and that this invention is never restricted to the illustrated embodiments. In drawings:

FIG. 7 and FIG. 8 show a curve representation of the illumination versus resistivity characteristic of the cell produced in accordance with the method of this invention and FIG. 9 through FIG. 14 are graphs showing the characteristics of the CdS vacuum evaporated film.

Figure 1:
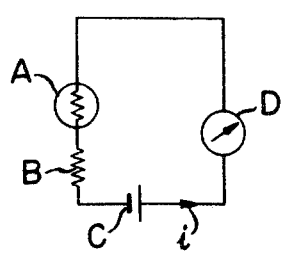
FIG. 1 shows a circuit diagram of the photometric circuit in which photoconductive cell is used.

The conventional and general photometric circuit which uses the conventional photoconductive cell comprises a photoconductive cell A, a compensating resistor B, a battery C and a galvanometer for indicating exposure value, as shown in FIG. 1.

Figure 2:
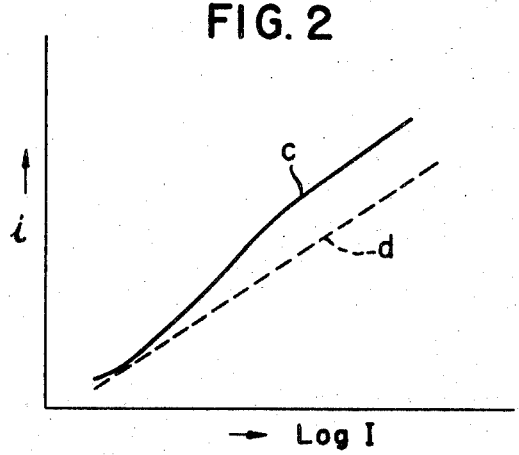
FIG. 2 shows a curve representation of the illumination versus current characteristic of the photoconductive cell.
Figure 3:
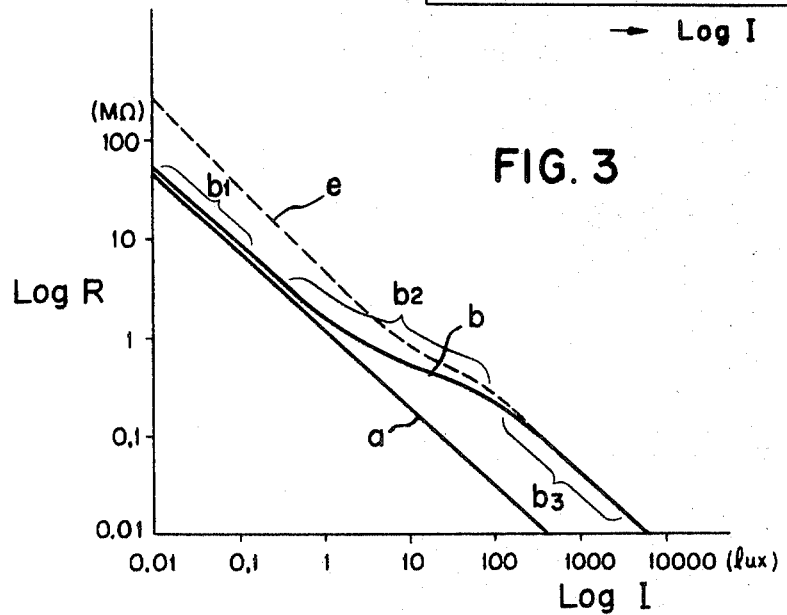
FIG. 3 shows a curve representation of the illumination versus resistivity of the photoconductive cell.

The illumination versus resistivity characteristic of the photoconductive cell used in the conventional photometric circuit is generally represented by "$a$" curve as shown in FIG. 3. As seen from the drawing, the logarithm, $\log.R$ of the resistivity of the photoconductive cell is linearly proportional to the logarithm of the intensity of illumination, that is, $\log.I$. Therefore, the current $i$ flowing through the galvanometer D is not proportional to the logarithm, $\log.I$ of the intensity of illumination. When the intensity of illumination I is small and large, the change of the current $i$ is small with respect to the change of $\log.I$ while in the case of the intermediate intensity of illumination, the change of current $i$ becomes large (as is represented by $c$ in FIG. 2). In the exposure meter, it is often desired that current is proportional to the logarithm, $\log.I$ of the intensity of illumination. The logarithm of the intensity of illumination is called as "exposure value," and in particular, when the base of the logarithm is 2, it is called as "light value" with respect to the exposure values. Generally, when exposure value or light value increases step by step, the intensity of illumination of the flux of light is changed ten time or twice. Such an exposure value or light value is remarkably convenient to represent the wide range of the intensity of illumination. Therefore, as shown by "$c$" curve in FIG. 2 the current $i$ flowing through the galvanometer significantly changes in the intermediate region of the intensity illumination of the flux of light, and the logarithm of the intensity of illumination is linearly proportional to the current thereat, and therefore, in this region, the exact photometry can be done. However, the intermediate region of the intensity of illumination does not extend so wide range of the intensity of illumination of the flux and is restricted to narrow region.

Figure 4:
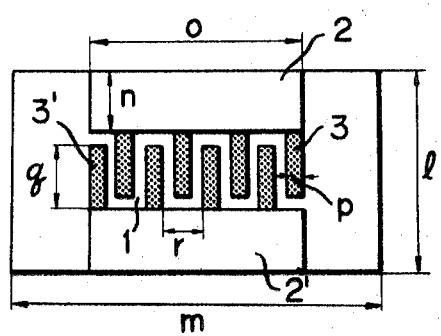
FIG. 4 shows a plane view of one embodiment of the photoconductive cell.

This invention provides the photoconductive cell without such defects as mentioned above. The following discussion will be made on the arrangement and the characteristics of the photoconductive cell of the first embodiment of this invention in connection with the drawings. Referring to FIG. 4, 1 is a photoconductive body formed on the insulating substrate such as ceramic of an appropriate thickness; 2 and 2' are metal electrodes formed on the opposite sides of the photoconductive body; 3 and 3' are semiconductive comb-like electrodes of relatively higher resistivity provided on the surface of the photoconductive body one of which end is connected to the metal electrodes 2 and 2'. As the photoconductive body 1, as mentioned hereinbefore, it is possible to use the compounds of Group II–VI such as CdS, CdSe, CdTe, ZnS, ZnSe, ZnTe, ZnO and the like; the solid solutions of the compounds such as Cd(S, Se), (Zn, Ca)S and the like or the compounds of Group III–V such as GaP, InSb and the like; the compounds of Group IV such as Ge, Si and the like; ceramic photoconductive material such as anthracene, polyvinylcarbazole and the like and other materials showing photoconductivity. The semiconductive electrodes 3 and 3' are made of the same material as the photoconductive material which exhibits no photoconductivity or substantially negligible photoconductivity as compared with photoconductive body and which has the intermediate value of specific resistance in which the photoconductive body 1 exhibits in the upper and lower limits of the intensity of illumination in the measured flux of light. The pattern and the number of the semiconductive electrodes 3 and 3' can be determined in accordance with the characteristics and the range of the intensity of illumination of the measured flux of light of the photoconductive body.

The following discussion is directed to the embodiment of the photoconductive cell wherein the photometric range of the intensity of illumination is from 0.01 to 10,000 lux, and the center region of the intensity of illumination is in the neighbourhood of 10 lux on the surface of the photoconductive cell. In this case cadmium sulfide, CdS is used as the photoconductive body, and CdS which substantially present no photoconductivity is used as resistive material for the electrodes.

As shown in FIG. 4, CdS film is uniformly deposited on the rectangular ceramic insulating substrate of 7 mm. in width $l$ and 13 mm. in length $m$ to form the photoconductive body 1.

The respective specific resistances of the photoconductive CdS under the different intensities of illumination body are as follows.

TABLE 1

| Illumination (lux): | Specific resistance (M$\Omega$/□) |
|---|---|
| 0.01 | 161 |
| 0.1 | 23.4 |
| 1 | 3.51 |
| 10 | 0.585 |
| 100 | 0.108 |
| 1,000 | 0.0269 |
| 10,000 | 0.00702 |

On both ends of the photoconductive CdS body, a rectangular tin (Sn) electrodes are formed as the metal electrodes 2 and 2', the width $n$ being 2.2 mm. and the length O being 7.6 mm.

Then, four rectangular electrodes of 0.6 mm. in width $p$, 2.2 mm. in length $q$, which made of CdS-thin film of which thickness is about 185 m$\mu$ and the specific resistance is 370 K$\Omega$/□ substantially showing no photoconductivity, are formed as the resistive electrodes 3 and 3' on the photoconductive body 1 at every interval of $r(=1.4$ mm.) from each of the electrodes 2 and 2' so that the each interval between the adjacent electrodes 3 and 3' becomes 0.4 mm. in the comb form.

In operation, the specific resistance of the photoconductive body 1 is high within the low range of the intensity of illumination I from 0.01 to 0.1 lux, and therefore, the resistance of the comb-like electrodes 3 and 3' does not take part in the resistivity of the body between the electrodes 2 and 2'. Therefore, in this case, the electrodes 3 and 3' present almost the same characteristics as in the case of the conventional electrodes of which resistivity can be neglected, and the characteristic curve is plotted as shown in the portion $b_1$ of the curve $b$ in FIG. 3.

Next, when the intensity of illumination I is in the neighbourhood of the center of the photometric range, i.e., when the intensity of illumination I is within the range from 0.5 to 100 lux, the specific resistance of the photoconductive body 1 becomes relatively low, and in the current path 2–3–1–3'–2' the specific resistance of the photoconductive body 1 becomes close to the value comparable to the specific resistance of the electrodes 3 and 3'. Therefore, the change of the specific resistance R between the electrodes 2 and 2' becomes apparently small under the influence of the electrodes 3 and 3' to the change of the intensity of illumination I, and the characteristic curve is plotted as shown by the portion $b_2$ of the curve $b$ of FIG. 3.

The intensity of illumination corresponding to the center of the portion $b_2$ is about 10 lux according to Table 1 shown hereinbefore.

When the intensity of illumination I is still more high, i.e., within the range from 1000 to 10,000 lux, the specific resistance of the photoconductive body 1 becomes lower than the specific resistance of the electrodes 3 and 3', and most of the current comes to flow through the path, the electrode 2—the photoconductive body 1—the counter—electrode 2' without flowing through the electrodes 3 and 3'. Thus, the specific resistance R between the electrodes 2 and 2' comes to be almost affected by the resistivity of the photoconductive body. Therefore, the ratio of the change of the resistivity R between the electrodes 2 and 2' to the change of the intensity of illumination becomes almost equal to the ratio of the change of the specific resistance of the photoconductive body 1 to the change of the intensity of illumination, and the characteristic curve is plotted as shown in the portion $b_3$ of the curve $b$ of FIG. 3.

The photoconductive cell in accordance with this invention has the excellent illumination versus resistivity characteristic as shown by the curve $b$ of FIG. 3, and the current is flowing through the photoconductive cell, as shown by the curve $d$ in FIG. 2, is closely proportional to the logarithm, log.I of the intensity of illumination with the result that expected excellent characteristics is provided.

For the sake of comparison, the electrodes 3 and 3' of the photoconductive cell were formed with the carbon film of which specific resistance is 370 KΩ/□, and the rest being the same as the above example prepared in accordance with the invention. With this cell, the intensity of illumination versus resistivity characteristics were measured to obtain the characteristics shown by the curve $e$ of FIG. 3. As seen from the drawing, the resistivity of the photoconductive cell is not lowered so much and this means undesirable characteristics for the expected object.

This is considered that this is mainly caused by the rectifying property between the photoconductive body 1 and the electrodes 3 and 3'.

Figure 5:
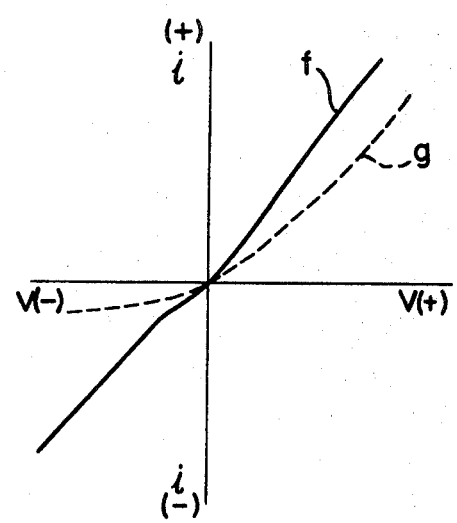
FIG. 5 shows the rectifying characteristic between the photoconductive body and the electrode in the photoconductive cell of this invention.

For example, when CdS electrodes 3 and 3' which do not present photoconductivity as mentioned above are formed on the CdS body 1, potential barrier is not established between the electrode 3 and the body 1, and between the photoconductor body 1 and the electrode 3', and ohmic contacts are made therebetween. Consider now the electrode 3 and the photoconductive body 1 and their contact. When voltage is applied to the electrode 3 in the direction from the negative to the positive, and the current flowing through the photoconductive body 1 is measured, the characteristics as shown by the curve $f$ in FIG. 5 is given. As seen from the drawing, when voltage is applied between the electrode 3 and the photoconductive body 1 the current corresponding to applied voltage is flowed, in other words, the so called ohmic contact can be formed. On the other hand, similarly the same can be applied to the relation between the electrode 3' and photoconductive body 1. Therefore, in such a photoconductive cell, the contact resistance between the electrodes and the photoconductive body is maintained almost constant, and the value thereof is not so much great. On the contrary when carbon coating electrodes are formed on the same photoconductive CdS body the curve $g$ as shown in FIG. 5 is plotted due to the relation between 3 and the photoconductive body 1, and between the photoconductive body 1 and the electrode 3'.

In operation, when voltage of the negative polarity is applied to the carbon electrode 3, backward bias is provided between the electrode 3 and the photoconductive body, and the potential barrier therebetween is more and more increased so that remarkably great contact resistance is produced. On the other hand, when the voltage of the positive polarity is applied to the carbon electrode 3, the electrode 3 and the photoconductive body 1 are forwardly biased, and the potential barrier produced therebetween is lowered, so that current flowing through the electrode 3 and the photoconductive body 1 is increased in response to the increase of the applied voltage. Therefore the contact resistance therebetween is not so much increased. In FIG. 5, the curve $g$ shows only the relation between the electrode 3 and the photoconductive body 1, but the same relation is true between the photoconductive body 1 and the electrode 3'. Thus, when both arrangements are combined, very large contact resistance can be provided for applied voltage of either direction. More specifically, when voltage of the positive polarity is applied to the photoconductive body 1, the photoconductive body 1 and the electrode 3' are forwardly biased. Reversely speaking, when voltage of the negative polarity is applied to the carbon electrode 3' both ones are backwardly biased and very large contact resistance can be provided. Therefore remarkably large contact resistance can be present, and only a little current is flowed through the electrode 3—the photoconductive body 1—the electrode 3' in either polarity The contact resistance results from the potential barrier generated between the electrode and the photoconductive body, as mentioned hereinbefore, and the height of the potential barrier is more or less lowered when the intensity of illumination of the luminous flux incident upon the cell is high, and as a result, the contact resistance is lowered when the intensity of illumination is lowered, contact resistance becomes remarkably large, and as is shown by the curve $e$ in FIG. 3, unpreferable characteristics which deviate from the expected characteristics can be presented when the illumination is low. The phenomenon occurs not only when the electrodes are formed of carbon film but also when the electrodes are formed of the material showing the rectifying property with respect to the photoconductive body.

In accordance with the first embodiment of this invention, the electrodes formed on the photoconductive body do not show the photoconductivity substantially and have relative high resistivity and in addition they are made of the same material as the photoconductive body. Therefore, the problem of rectifying property can be perfectly solved, and it is possible to obtain the photoconductive cell having the expected excellent characteristics.

In particular, characteristics of the photoconductive cell in the photoconductive cell of the invention is not affected by thermal or chemical reactions or other treatments in the producing steps. For material used for the electrodes of small charge in resistance and for material used for the photoconductive body showing high sensitivity and spectro-sensitivity desirable for photometry, it is most preferable to form CdS electrodes on CdS body, SdSe electrodes on CdSe body and Cd(S, Se) electrodes on Cd(S, Se) body among many other materials described hereinbefore.

Figure 6:
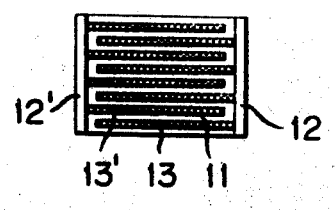
FIG. 6 shows a plane view of other embodiment of the photoconductive cell of this invention.
Figure 7:
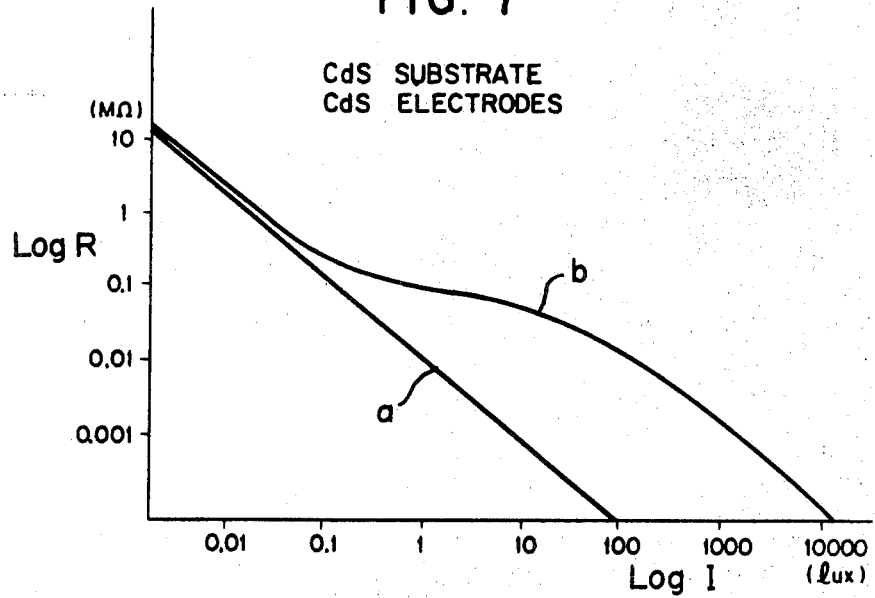
Figure 8:
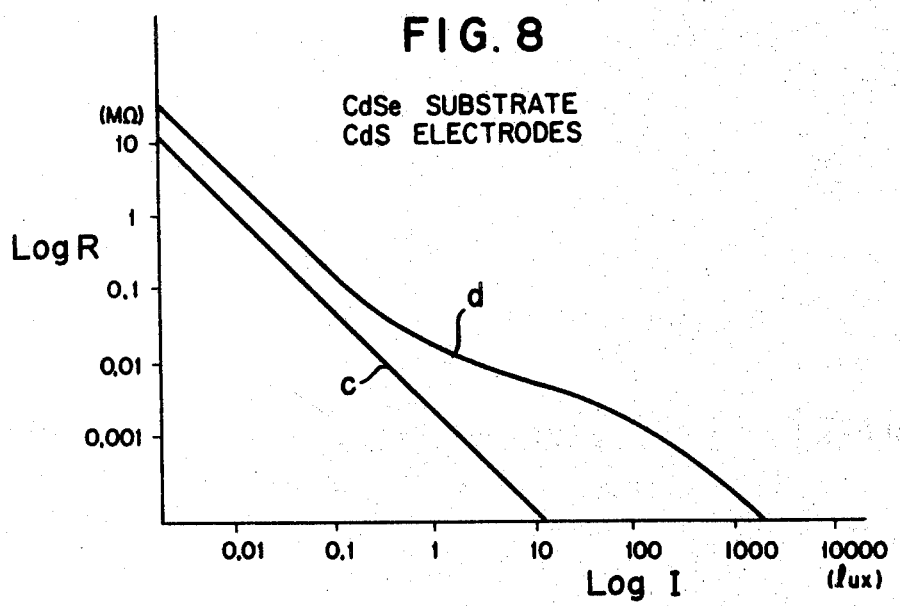

Referring to FIGS. 3 and 6, characteristics and the arrangement of the second embodiment of the photoconductive cell of the invention will be described hereinafter. The photoconductive cell of the second embodiment shown in FIG. 6 is as follows: 11 is the photoconductive body formed on the insulating base such as ceramic having appropriate thickness; 12 and 12' are the ordinary metal electrodes provided on the opposite end portions of the photoconductive body 11 by vacuum evaporating; 13 and 13' are the semiconductive electrodes provided on the surface of the photoconductive body 11, with relatively high resistivity, and one end of which are connected to the metal electrodes 12 or 12'. For the photoconductive body 11, it is possible to use one or more of materials selected from thhe group consisting of the sulfides such as zinc or cadmium, selenide, or telluride and the oxides which should present photoconductivity. On the other hand, it is desirable to use, for the semiconductive electrodes, one or more of kinds of materials selected from photoconductive materials which have work function similar to the body such as ZnS, ZnSe, CdS, ZnTe, CdSe, CdTe and ZnO and which have no photoconductivity or have negligible photoconductivity, and in addition which have mean value to respective specific resistance which is exhibited by the body in the upper limit and the lower limit of the photometric range of the intensity of illumination of the luminous flux. Such materials can be easily obtained by controlling the deviation from the stoichiometric composition of the photoconductive material. The pattern and the number of fingers of the semiconductive electrodes 13 and 13' can be appropriately selected in accordance with the characteristics of the photoconductive body and the photometric range the intensity of illumination.

In operation, in the range where the intensity of illumination I is relatively low, the specific resistance of the photoconductive body 11 is high, and therefore the resistivity of the semiconductive electrodes 13 and 13' do not so much contribute to the resistivity of the electrodes 12 and 12'. Therefore, in this case the electrodes 13 and 13' exhibit the same characteristics as those of the case in which the semiconductive electrodes 13 and 13' are made of the conventional electrodes, and the characteristics curve shown by the portion $b_1$ of the curve $b$ in FIG. 3 is plotted.

Next, when the intensity of illumination I is in the neighbourhood of the photometric range of the intensity of illumination, the specific resistance 11 of the photoconductive body becomes relatively low, and the resistivity of the photoconductive body 11 in the current path 12–13–11–13'–12' becomes close to the comparable value to the resistivity of the semiconductive electrodes 13 and 13'. Therefore the change of the resistivity R between the electrodes 12 and 12' to the change of the intensity of illumination I becomes apparently small, and the characteristic curve as shown by the portion $b_2$ of the curve $b$ of FIG. 3 is obtained.

When the intensity of illumination I is in higher range, the resistivity of the photoconductive body 11 becomes lower than the resistivity of the semiconductive electrodes 13 and 13', and most of current flows through the path of the electrode 12—the photoconductive body 11—the electrode 12', without flowing through the semiconductive electrodes 13 and 13'. The resistivity R of the electrodes 12 and 12' is almost affected by the resistivity of the photoconductive body 11. Therefore, the ratio of the change of the resistivity of the electrodes 12 and 12' to the change of the intensity of illumination becomes almost equal to the ratio of the change of the specific resistance of the photoconductive body to the change of the intensity of illumination, and the characteristic curve as shown by the portion $b_3$ of the curve $b$ in FIG. 3 is obtained. The photoconductive cell of this invention has the characteristics of the intensity of illumination versus resistivity as shown by curve $b$ in FIG. 5. The current $i$ flowing through the photoconductive cell is closely proportional to the logarithm, $\log I$ of the intensity of illumination, as shown by the curve $d$ in FIG. 2, and the desired characteristics adapted for the expected object can be provided.

Thus, in accordance with the invention, it is possible to obtain easily the photoconductive cell having the desired characteristics of the intensity of illumination versus resistivity as an element adapted for the photometric circuit, as shown by the curve $b$ in FIG. 3. In particular the electrodes 13 and 13' are formed of the semiconductor having the work function similar to that of the photoconductive body, and therefore the problem of rectifying property can be solved so as to improve further characteristics of the cell.

Thus, in accordance with the invention, an exposure meter having linearly photometric wide range can be easily realized without using a plurality of compensating resistors or complicated circuit.

This invention is not restricted to the illustrated embodiments. For example the electrodes 2, 2'; 12, 12' can be made of the same materials as the semiconductive electrodes 3, 3'; 13, 13' and the pattern of the electrodes 3, 3'; 13, 13' can be suitably modified to many other forms. Various kinds of modifications can be made within the scope of this invention.

Next, referring to FIG. 7 through FIG. 14, explanation will be given about the method for producing the photoconductive cell of the first and the second embodiments of this invention wherein CdS is used for the electrodes and the electrodes made of CdS are vacuum evaporated on the photoconductive body. It is preferably that material of the electrodes of this invention has relatively high specific resistance and the resistance value corresponding to the mean value of the specific resistance of the photoconductive body presented in the intensity of illumination between the upper and lower limits of the photometric range, and that substantailly no rectifying properties are presented between the same and the photoconductive materials. Further, in the producing process, it is also desirable that the heat or chemical reaction should not affect the characteristics of the photosensitve body, and that the change of the characteristics of the electrodes, in particular, the change of the resistivity thereof is little, and that any desirable pattern of electrodes can be easily formed. In accordance with this invention, the semiconductor material, particularly CdS is used for the electrodes and by the vacuum evaporating of the same the electrodes are provided on the photoconductive body. Any desired pattern can be vacuum evaporated by controlling the thickness of the vacuum evaporated film, vacuum evaporating temperature, and the temperature of the substrate. CdS electrodes are formed which show no photoconductivity and have the resistance value corresponding to the mean value of specific resistance presented by the photoconductive body in the intensity of illumination between the upper and lower limits of the photometric range.

Figure 9:
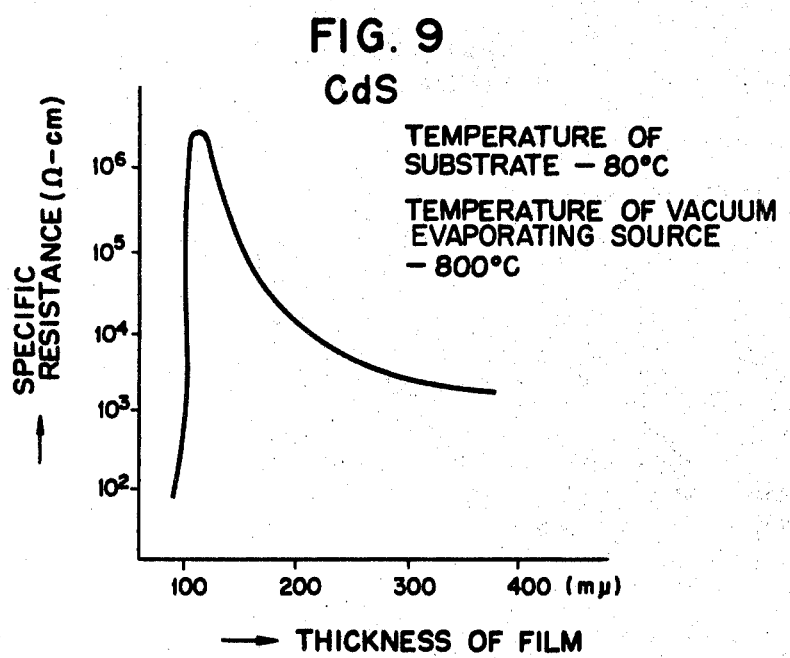
Figure 13:
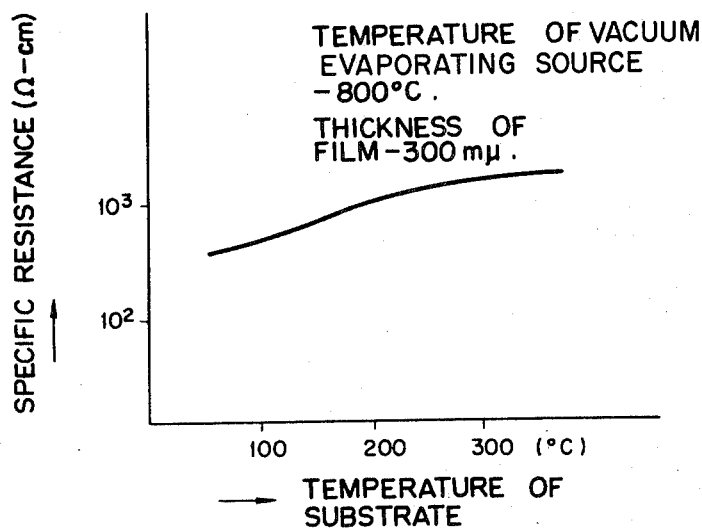
Figure 14:
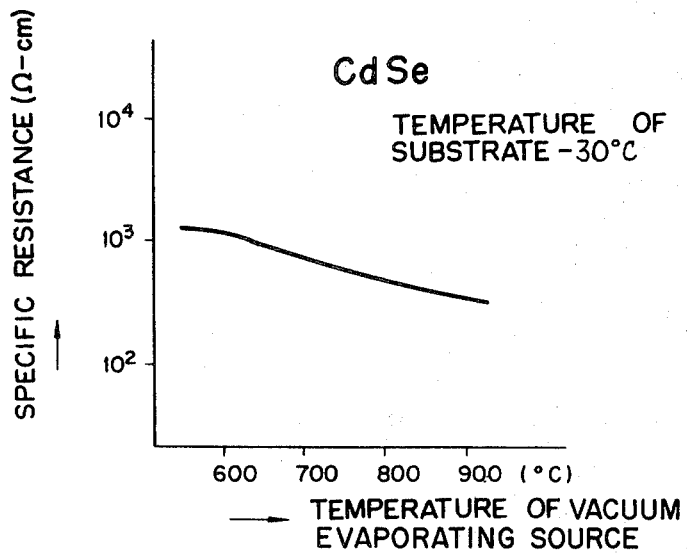

It has been found by the inventor that, where CdS is formed into a vacuum evaporated film by vacuum evaporating the same specific resistance of the vacuum evaporated film layer significantly changes more than other materials by controlling the thickness of the film, the temperature of the substrate and the temperature of the vacuum evaporating source. On the basis of the discovery, in accordance with the invention, vacuum evaporated film having a predetermined specific resistance can be formed. It was confirmed through experiments that in vacuum evaporating CdS, as shown in FIG. 9 to FIG. 11 the deviation from stoichiometric composition thereof can be easily changed depending on the conditions such as the thickness of the vacuum evaporated film, the temperature of the substrate and the temperature of the vacuum evaporating source and the specific resistance of the vacuum evaporated film layer can be changed over the very wide range. The change of the specific resistance is remarkable as compared with CdSe which is a semiconductor belonging to the compounds of Group II–VI, and it is still more significance with regard to other semiconductors. For example, comparing FIG. 9 with 12, FIG. 10 with 13, FIG. 11 with 14, it is apparent that the specific resistance of the vacuum evaporated film layer of CdS is more greatly changed than that of CdSe by the change of the temperature of the vacuum evaporating source, the thickness of the film layer, and the temperature of the substrate. Therefore, when these conditions are appropriately controlled, it is possible to produce any specific resistance of the vacuum evaporated film of CdS. Thus, in producing the photoconductive cell having the expected characteristics, the pattern and the number of the finger of electrodes should be appropriately selected, and in addition the temperature of the vacuum evaporating source, the tempertaure of the substrate and the thickness of film should be suitably controlled when produced to form the electrodes which have the resistance value corresponding to an intermediate value of the specific resistance exhibited by the photoconductive body in response to the intensity of illumination encountered between the upper and the lower limits of the photometric range. In particular, the CdS film without any treatment does not present photoconductivity as it is, and even should the photoconductivity be present, it is very little and photoconductivity can be substantially neglected as compared with that of the photoconductive body. The CdS film shows little rectifying property to the photoconductive body other than Cds, so that the excellent photoconductive cell of this invention can be obtained. The following is the embodiments of the invention.

Example 1

As shown in FIG. 4, CdS sintered film 1 having the specific resistance of 2.5 $m\Omega/\square$ at 1 lux and of 30 $K\Omega/\square$ at 1000 lux was formed on a rectangular ceramic insulating substrate of 7 mm. in width $l$ and 13 mm. in length $m$. Then, on both ends of the photoconductive CdS body two rectangular tin (Sn) electrodes of 2.2 mm. in width $n$ and 0.6 mm. in length O were formed by vacuum evaporating. Then four rectangular comb like CdS films, with the width being $p(=0.6$ mm.), the length being $q(=2.2$ mm.) as the semiconductor electrodes 3 and 3' were vacuum evaporated at the interval or $r=1.4$ mm. between each of the fingers on the photoconductive body 1, in such a manner that one end thereof can be connected to the metal electrodes 2 and 2', by controlling the temperature of the substrate to be at room temperature and by controlling the temperature of the vacuum evaporating source to be at 750° C. When the thickness of the vacuum evaporated film could become about 200 m$\mu$, the specific resistance of CdS comb-like electrodes presented 500 $k\Omega/\square$. The total characteristics of the resultant photoconductive cell were desirable for the expected object as shown by the curve $b$ in FIG. 7.

Example 2

As shown in FIG. 4, CdSe sintered film 1 having the specific resistance of 30 $m\Omega/\square$ at 1 lux and 6 $k\Omega/\square$ at 1000 lux was formed on a rectangular ceramic insulating substrate with the width thereof being $l=7$ mm., the length thereof being $m=13$ mm. Next, rectangular tin (Sn) electrodes with the width thereof being $n(=2.2$ mm.), the length thereof being O$(=7.6$ mm.) as the metal electrodes were deposited on the photoconductive CdSe body 1 at both ends thereof. Then, four rectangular comb-like CdS films, the width thereof being $p(=0.6$ mm.), the length thereof being $q(=2.2$ mm.) for the semiconductive electrodes 3,3', were deposited on the photoconductive CdSe body 1 by vacuum evaporating at the interval $r=1.4$ between each of the fingers, in such a manner that one end thereof could be connected to the metal electrodes 2 and 2', by controlling the temperature of the substrate to be at room temperature and the temperature of the vacuum evaporating source to be at 750° C. As a result, the thickness of the film could become about 500 m$\mu$, and the specific resistance of the CdS comb-like electrodes were $80=K\Omega/\square$. The total characteristics of the resultant photoconductive cell are preferable for the expected object, as shown by the curve $d$ in FIG. 8. As described hereinbefore, in accordance with the invention, the semiconductive electrodes are formed of CdS vacuum evaporated film, and therefore highly precise electrode patterns can be easily formed. Further, the deviation from stoichiometric composition of CdS vacuum evaporated film can be easily changed due to the temperature of the substrate the temperature of the vacuum evaporating source, and the thickness of the vacuum evaporated film or the like factors when the vacuum evaporating is performed, and the resistance thereof is changed over a remarkably wide range. Furthermore, in the vacuum evaporated state of CdS without any treatment it is possible to regard as it present no photoconductivity, and therefore it is possible to form appropriate specific resistance of the electrodes in accordance with the specific resistance of the body. In addition, the CdS vacuum evaporated film has relatively low rectifying properties, and therefore it is possible to attain remarkable effect especially, when CdS which is generally used for the body is employed, since the same materials form a contact of low rectifying property.

This invention provides a new photoconductive cell wherein the current flowing through the cell is proportional to the logarithm of the incident light flux. Thus, when photometric circuit is made by using such a cell, it is not required to employ complicated circuit or a great number of compensating resistors, and it is possible to provide the photometric circuit having linearly wide photometric range. When the photoconductive cell and condensers are connected to form a delay element and the delay element and a switching circuit are combined, so called "electric shutter circuit" which is remarkably excellent as a photometric circuit is presented. Further, when the photoconductive cell of this invention is used to form photometric circuit, and prepared photometric circuit is incorporated into a camera, it is possible to provide a camera of very wide photographing range. This invention is thus very effective from such practical point of view. Especially, in accordance with this invention, it is needless to mention herein, that various kinds of modifications such that stabilizers, sensitizers or other materials can be added and mixed with materials of the photoconductive body and the electrodes.

I claim:

1. A method for producing a photoconductive cell which comprises the steps of depositing photoconductive materials on a substrate in the form of a layer; vacuum evaporating in the predetermined pattern on said layer, a film nonstoichiometric cadmium sulfide having a work function similar to the photoconductive material to form at least part of the electrodes therefor, and controlling the nonstoichiometry of said film to provide electrodes (1) at least substantially nonphotoconductive; and (2) having a specific resistance intermediate the highest and lowest specific resistance of said layer over the intended photomeric range of the cell.

2. A method for producin ga photoconductive cell according to claim 1 wherein the nonstoichiometry of the vacuum evaporated film is at least partially controlled by varying the thickness of the film.

3. A method for producing a photoconductive cell which comprises the steps of depositing photoconductive material on a substrate in the form of a layer, vacuum evaporating in a predetermined pattern on to said layer a film of nonstoichiometric cadmium sulfide having a work function similar to the photoconductive material to form at least part of the electrodes therefor and simultaneously controlling the thickness of said film, the temperature of the substrate and the temperature of the source of cadmium sulfide to be vacuum evaporated in order to provide electrodes (1) at least substantially nonphotoconductive and (2) having a specific resistance intermediate the highest and lowest specific resistance of said layer over the intended photometric range of the cell.

References Cited

UNITED STATES PATENTS

| | | | |
|---|---|---|---|
| 2,766,144 | 10/1956 | Lidow | 338—15 |
| 3,013,232 | 12/1961 | Lubin | 338—15 |
| 3,040,180 | 6/1962 | Healy | 338—15 |
| 3,447,234 | 6/1969 | Reynolds et al. | 338—15 |

HOWARD S. WILLIAMS, Primary Examiner

D. R. VALENTINE, Assistant Examiner

U.S. Cl. X.R.

117—106 R, 215; 204—192

UNITED STATES PATENT OFFICE
CERTIFICATE OF CORRECTION

Patent No. 3,826,683         Dated July 30, 1974

Inventor(s) KAZUHIKO IHAYA

It is certified that error appears in the above-identified patent and that said Letters Patent are hereby corrected as shown below:

Column 2, line 71, "iluumination" should read --illumination--.
Column 5, line 3, "XnSe" should read --ZnSe--.
Column 5, line 6, "Gap" should read --GaP--.
Column 7, line 29, "ten time" should read --ten times--.
Column 9, line 12, "is" should read -- i --.
Column 10, line 19, "The" should read --This--.
Column 10, line 39, "SdSe" should read --CdSe--.
Column 10, line 57, "thhe" should read --the--.
Column 11, line 73, "preferably" should read --preferable--.
Column 12, line 4, "substantailly" should read --substantially--.
Column 12, line 54, "film of CdS" should read --film layer of CdS--.
Column 12, line 59, "tempertaure" should read --temperature--.
Column 12, line 73, "Cds" should read --CdS--.
Column 13, line 8, "0.6mm" should read --7.6mm--.
Column 13, line 46, "80=KΩ/□" should read --80KΩ/□--.
Column 14, line 27, "materials" should read --material--.
Column 14, line 28, "the" should read --a--.
Column 14, line 36, "photomeric" should read --photometric--.
Column 14, line 37, "producin ga" should read --producing a--.

Signed and sealed this 7th day of January 1975.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,826,683  Dated July 30, 1974

Inventor(s) KAZUHIKO IHAYA

It is certified that error appears in the above-identified patent and that said Letters Patent are hereby corrected as shown below:

Column 1, line 10, "42/12,442" should read

--42/12412--.

Signed and Sealed this fourteenth Day of October 1975

[SEAL]

Attest:

RUTH C. MASON  
*Attesting Officer*

C. MARSHALL DANN  
*Commissioner of Patents and Trademarks*